United States Patent
Kruckeberg et al.

(10) Patent No.: US 9,861,035 B2
(45) Date of Patent: *Jan. 9, 2018

(54) HEIGHT OF CUT CONTROL SYSTEM

(71) Applicant: Deere & Company, Moline, IL (US)

(72) Inventors: John P. Kruckeberg, Thomson, GA (US); Tejal Sarda, Pune (IN)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,306

(22) Filed: Oct. 19, 2016

(65) Prior Publication Data
US 2017/0034996 A1    Feb. 9, 2017

Related U.S. Application Data

(63) Continuation-in-part of application No. 14/702,454, filed on May 1, 2015.

(51) Int. Cl.
    *A01D 34/74*    (2006.01)
    *A01D 34/00*    (2006.01)
    A01D 34/66     (2006.01)
    A01D 101/00    (2006.01)

(52) U.S. Cl.
    CPC .......... *A01D 34/74* (2013.01); *A01D 34/008* (2013.01); *A01D 34/66* (2013.01); *A01D 2101/00* (2013.01)

(58) Field of Classification Search
    CPC ...... A01D 34/008; A01D 34/24; A01D 34/28; A01D 34/74
    USPC ............................................. 56/10.2 E, 17.1
    See application file for complete search history.

(56) References Cited

U.S. PATENT DOCUMENTS

| | | | | |
|---|---|---|---|---|
| 3,505,577 A | * | 4/1970 | Hirokawa | G05D 1/0206 114/144 R |
| 3,556,225 A | * | 1/1971 | Matsuzaki | E02F 3/841 172/4.5 |
| 3,948,024 A | | 4/1976 | Allen et al. | |
| 4,120,136 A | * | 10/1978 | Rose | A01B 59/044 56/15.8 |
| 4,136,508 A | * | 1/1979 | Coleman | A01D 41/141 56/10.2 E |
| 4,663,923 A | | 5/1987 | Boice | |

(Continued)

FOREIGN PATENT DOCUMENTS

| | | |
|---|---|---|
| JP | 1174307 A | 7/1989 |
| JP | 1179616 A | 7/1989 |

(Continued)

*Primary Examiner* — John Weiss

(57) ABSTRACT

A height of cut control system on a mower deck includes a linear actuator connected to the lift linkage. A height of cut dial has a plurality of operator-selected desired cutting heights, and a deck height control is connected to the electronic controller that commands the linear actuator to lower or raise the mower deck to the desired cutting height when the deck height control is in a down position or an up position. A deck height display provides visual feedback of operator selected cutting height and actual cutting height. If the actual height is at least a specified amount off the operator selected cutting height, the electronic controller may automatically adjust the mower deck by commanding the linear actuator to move the mower deck to the desired cutting height.

11 Claims, 4 Drawing Sheets

(56) References Cited

U.S. PATENT DOCUMENTS

| | | | |
|---|---|---|---|
| 5,123,234 A * | 6/1992 | Harada | A01D 34/6806 56/10.2 E |
| 5,138,825 A | 8/1992 | Trefz et al. | |
| 5,187,925 A | 2/1993 | Patterson et al. | |
| 5,351,467 A | 10/1994 | Trefz et al. | |
| 5,381,648 A | 1/1995 | Seegert et al. | |
| 5,557,154 A | 9/1996 | Erhart | |
| 5,784,870 A | 7/1998 | Seegert et al. | |
| 5,797,252 A | 8/1998 | Goman | |
| 5,816,033 A | 10/1998 | Busboom et al. | |
| 5,946,893 A | 9/1999 | Gordon | |
| 6,427,430 B1 | 8/2002 | Swartzendruber | |
| 6,438,532 B1 * | 8/2002 | Kiji | G06N 5/025 706/45 |
| 6,494,028 B2 | 12/2002 | Moore | |
| 6,588,188 B2 | 7/2003 | Dennis | |
| 6,837,032 B1 | 1/2005 | Swartzendruber et al. | |
| 7,146,786 B2 | 12/2006 | Brandon | |
| 7,448,191 B2 | 11/2008 | Elhardt et al. | |
| 7,578,117 B2 * | 8/2009 | Shaffer | A01D 34/74 56/17.1 |
| 7,613,552 B2 * | 11/2009 | Bernini | A01D 34/008 180/168 |
| 7,614,207 B2 | 11/2009 | Elhardt et al. | |
| 7,631,478 B2 * | 12/2009 | Henson | A01D 34/62 56/15.3 |
| 7,647,753 B2 * | 1/2010 | Schlipf | A01D 41/141 56/10.2 E |
| 7,716,906 B2 | 5/2010 | Swart | |
| 7,877,976 B2 * | 2/2011 | Honas | A01D 57/20 56/208 |
| 8,067,917 B2 * | 11/2011 | Spearing | G05B 13/0205 318/135 |
| 8,136,334 B2 * | 3/2012 | Rinholm | A01D 34/44 56/249 |
| 8,803,576 B2 * | 8/2014 | Kitagawa | H03K 5/06 327/147 |
| 8,919,087 B2 * | 12/2014 | Lancaster | A01D 34/74 56/15.8 |
| 2006/0021312 A1 * | 2/2006 | Brandon | A01D 34/006 56/10.2 R |

FOREIGN PATENT DOCUMENTS

| | | |
|---|---|---|
| JP | 5260838 A | 10/1993 |
| JP | 1042654 A | 2/1998 |

* cited by examiner

HEIGHT OF CUT CONTROL SYSTEM

CROSS-REFERENCE TO RELATED APPLICATION

This application is a Continuation-In-Part of application Ser. No. 14/702,454 filed May 1, 2015.

FIELD OF THE INVENTION

This invention relates generally to height adjustable mower cutting decks, and specifically to a height of cut control system for a mower deck.

BACKGROUND OF THE INVENTION

Vegetation cutting implements known as mower cutting decks are typically carried by compact utility tractors, other utility vehicles, lawn and garden tractors or zero turn mowers. These vehicles have mower deck lift linkages allowing adjustment of the decks between a range of heights above ground level. Ordinarily, the range extends between a position at or below the lowest available cutting height to a position at or above the highest available cut height. Adjustment to a position below the cutting height range is frequently preferred for ease in installation or removal of the deck from the vehicle because the deck is at or very close to the ground surface. Adjustment above the cut height range may permit the deck to clear obstacles encountered while traveling across the ground. This maximum height may be referred to as the deck transport position.

Adjustment of the cutting deck height may be accomplished by various mechanisms including hand-operated levers and bars positioned in the vicinity of the tractor's or mower's operator station. The height of cut control systems require an operator to either push or pull on a lever or bar to adjust the deck height. Pedal actuated mechanisms also are used to adjust cutting deck height relative to the vehicle frame, and may include a handle or other hardware which automatically locks the mower deck in a given position upon full actuation of the pedal.

Examples of height of cut control systems for mower decks include U.S. Pat. No. 4,120,136 for "Implement Supporting and Lifting Linkage"; U.S. Pat. No. 5,138,825 for "Riding Mower Having a Pedal Operated Height Adjustment Mechanism, Air Assisted Discharge, and Improved Hydrostatic Shift Linkage"; U.S. Pat. No. 5,187,925 for "Mower Deck Lift System Handle Mechanism"; U.S. Pat. No. 5,351,467 for "Height Adjustment Mechanism for Riding Mower Cutting Deck"; U.S. Pat. No. 5,381,648 for "Mower Deck Height Adjustment Mechanism": U.S. Pat. No. 5,797,252 for "Height of Cut Adjustment Mechanism"; U.S. Pat. No. 5,816,033 for "Riding Lawn Mower Including a Mower Deck Height Control Mechanism"; U.S. Pat. No. 5,946,893 for "Lawn Mower Having Cutter Deck Motion Coupled to Mower Wheel Motion"; U.S. Pat. No. 6,427,430 for "Pedal Lift System for Lawn Tractor Mower Deck"; U.S. Pat. No. 6,494,028 for "Deck Lift Apparatus for Riding Mower"; U.S. Pat. No. 6,588,188 for "Foot Lift Cutter Deck Mower Units"; U.S. Pat. No. 6,837,032 for "Pedal Actuated Height Adjustment Mechanism for a Mower Cutting Deck"; U.S. Pat. Nos. 7,448,191 and 7,614,207 for "Mower Deck Lift System with Transport Lock"; and U.S. Pat. No. 7,716,906 for "Single Lever Mower Deck Height-Of-Cut Control."

Height of cut control systems with linear actuators have been proposed for mower decks. For example, patents describing linear actuators include U.S. Pat. No. 3,948,024 for "Implement Position Control System"; U.S. Pat. No. 4,663,923 for Self-Propelled Mower"; Japanese Application No. JP-H1-174307A; Japanese Application No. JP-H1-179616A; Japanese Application No. JP-H10-42654A; Japanese Application No. JP-H5-260838A; and U.S. Pat. No. 7,146,786 for "Electric Linear Deck Lift Assembly". These height of cut control systems include linear drive rods, positional sensors and/or linear potentiometers to move mower decks to desired cutting heights. However, mower decks have a tendency to shift away from desired cutting heights due to wear over time or impacts with objects. As a result, height of cut control systems may lose accuracy of cutting height during normal use. A height of cut control system is needed that can adjust or return a mower deck to the desired cutting height while mowing. A height of cut control system also is needed that provides visual feedback to the operator showing if the actual height of the mower deck is off the desired cutting height.

In the past, height of cut control systems have required raising the mower deck off a stop before changing the desired cutting height. A height of cut control system is needed that allows an operator to move the mower deck to various different cutting heights while continuing to mow.

SUMMARY OF THE INVENTION

A height of cut control system on a mower deck includes a linear actuator connected to the lift linkage. A height of cut dial has a plurality of operator-selected desired cutting heights, and a deck height control connected to the electronic controller that commands the linear actuator to lower or raise the mower deck to the desired cutting height when the deck height control is in a down position or an up position. The height of cut control system allows an operator to move the mower deck to various different cutting heights while continuing to mow.

A potentiometer connected to the electronic controller may provide signals indicating the actual height of the mower deck. A deck height display provides visual feedback to the operator showing if the actual height of the mower deck is off the desired cutting height. If the actual height is at least a specified amount off the desired cutting height, the electronic controller may automatically adjust the mower deck by commanding the linear actuator to move the mower deck to the desired cutting height.

DESCRIPTION OF THE PREFERRED EMBODIMENT

Figure 1:
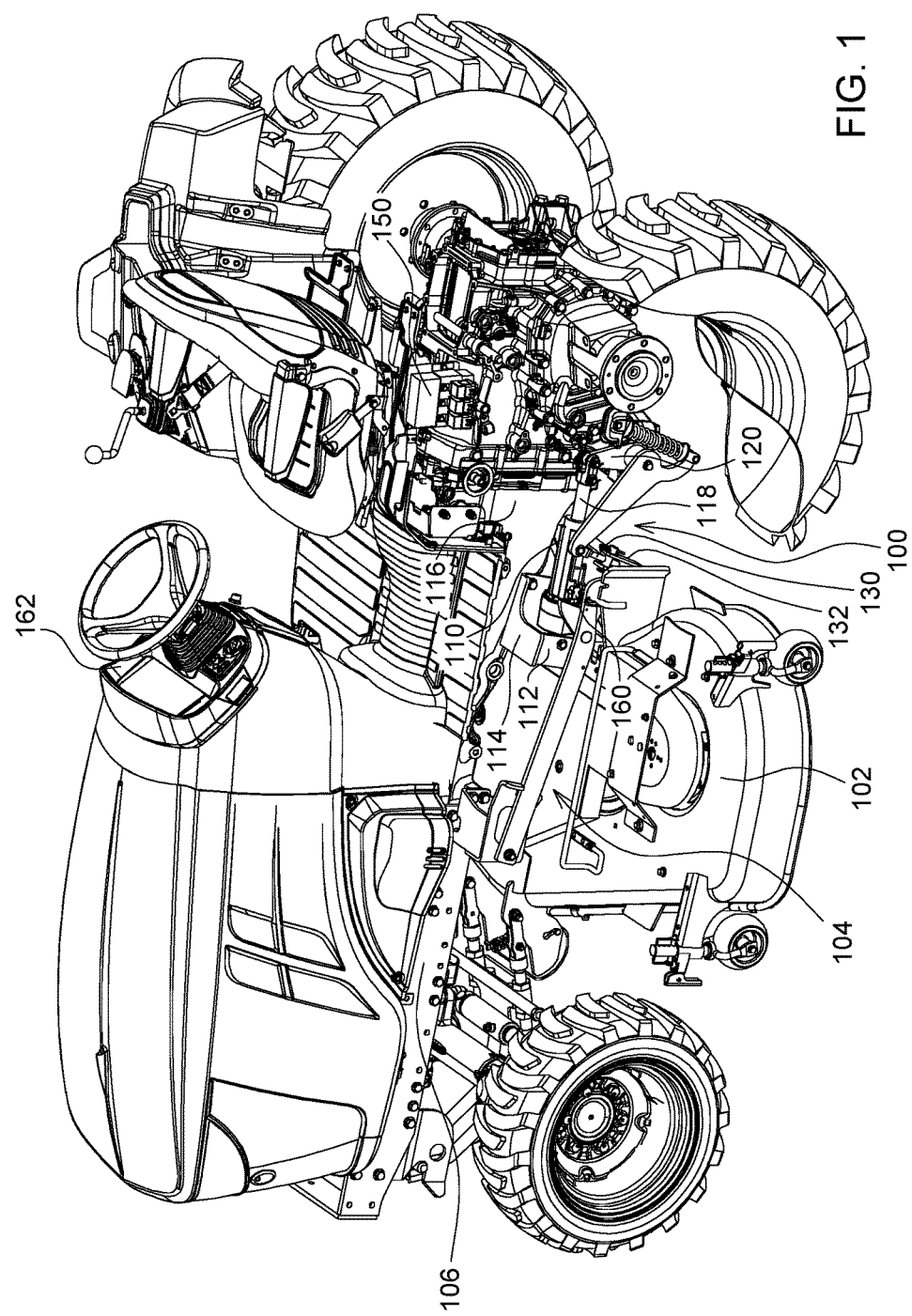
FIG. 1 is a perspective view of a compact utility tractor with a height of cut control system according to one embodiment of the invention.
Figure 2:
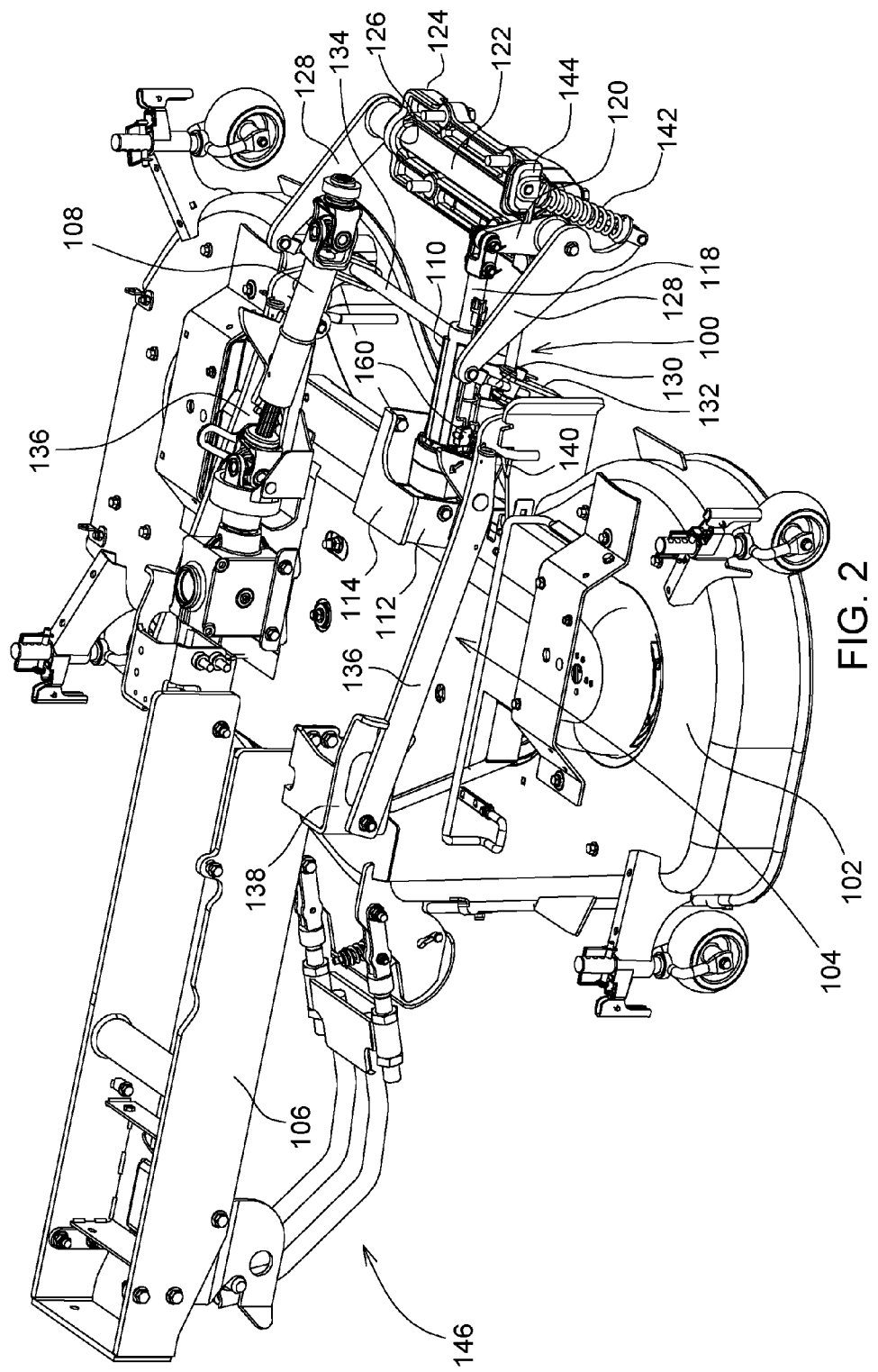
FIG. 2 is a perspective view of a height of cut control system according to one embodiment of the invention.
Figure 3:
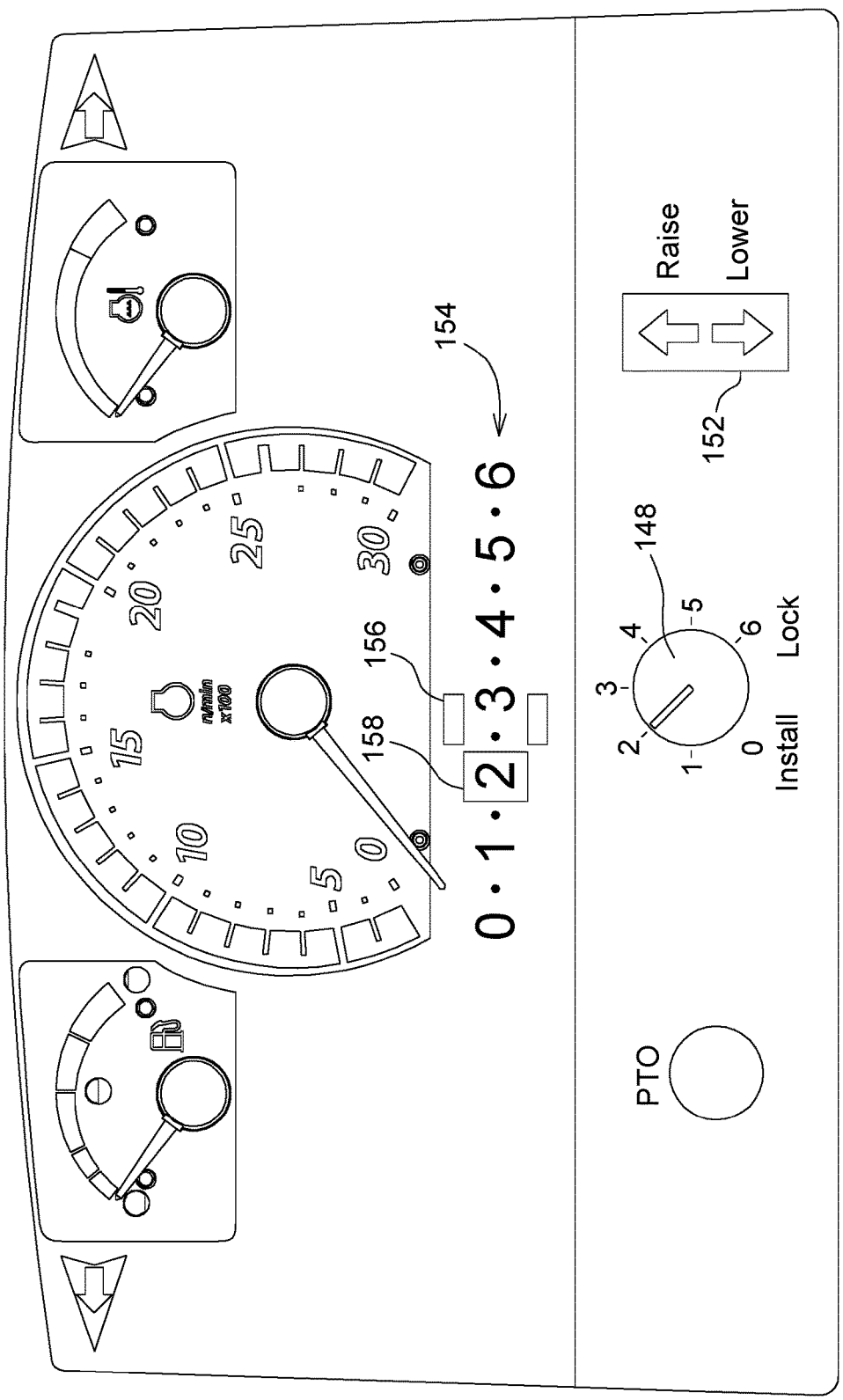
FIG. 3 is a perspective view of an operator station of a height of cut control system according to one embodiment of the invention.

In a first embodiment shown in FIGS. 1-3, height of cut control system 100 may be installed with mower deck 102 having mower deck rear lift linkage 104 having a forward end mounted to and/or suspended under vehicle frame 106 between the front and rear wheels of a compact utility tractor or other utility vehicle, lawn and garden tractor or zero turn mower. The mower deck may receive power from an engine or other power source through PTO shaft 108, belts and pulleys, or a gearbox.

In one embodiment, height of cut control system 100 may include linear actuator 110 connected to rear lift linkage 104 and powered by electric motor 112. The linear actuator may be mounted with actuator mount 114 to transmission housing 116 or the vehicle frame. The linear actuator may be capable of actuating against compressive and tension forces of up to about 7000 N at a speed of about 20 mm/second. Piston travel of the actuator may be sufficient to provide movement of the mower deck from the lowest or install position to the highest or lock position. For example, a stroke length of about 4 inches may be sufficient to lower and raise the mower deck to each height within the described height range. The linear actuator also should be capable of reliable operation in adverse mowing conditions including vibration, high temperatures, dust and moisture. The linear actuator may include rod 118 extending rearwardly and that may be pivotably connected with a pin to actuator bell crank 120. The actuator bell crank may be attached to mower rockshaft 122. Rockshaft support 124 may be mounted transversely across and under the rear axle housing or vehicle frame and may include bushings 126 that pivotably support the mower rockshaft. Deck lift bell cranks 128 may be mounted to the opposing ends of the mower rockshaft. The mower deck rear lift linkage may include lift links 130 suspended from each deck lift bell crank, and hangers 132 that may connect the lift links to cross rod 134. The rear lift linkage also may include draft arms 136 mounted to each opposing end of the cross rod. Each draft arm may have a forward end pivotably mounted to a support 138 attached to the vehicle frame, and a rearward end with a fork 140 that engages a rear draft mower support on the mower deck.

In one embodiment, height of cut control system 100 may include deck lift assist spring 142 which may include a coil spring and shock absorber connected together between a lower portion of deck lift bell crank 128 and bracket 144 attached to rockshaft support 124. The deck lift assist spring may be compressed as the mower deck is lowered and provide additional force to help raise the mower deck. The spring compression force may be based on the weight of the mower deck, and should provide sufficient force to assist the linear actuator in lifting the mower deck from the lowest position to the highest position.

In one embodiment, the mower deck also may be supported by front draft pivot assembly 146 connecting the front of the mower deck to a front portion of the compact utility tractor frame 106.

In one embodiment, height of cut control system 100 may include deck height dial 148 connected to electronic controller 150. The deck height dial may have various desired cutting height settings that an operator may select, such as 1 inch up to 6 inches, an install position, and a locked position for transport.

In one embodiment, height of cut control system 100 may include deck height control 152 connected to controller 150. The deck height control may be a lever, button or switch, that an operator may use to move the mower deck up or down to the setting on the deck height dial. For example, if the operator sets the deck height dial to a desired cutting height, he or she may push and hold the deck height lever forward (or actuate a lower button or switch) to signal the electronic controller to command the linear actuator to lower the mower deck to the desired cutting height. If the operator sets the deck height dial to the locked position, the operator may pull back and hold the deck height lever rearward (or actuate a raise button or switch) to signal the electronic controller to command the linear actuator to fully raise the mower deck to a locked position for transport. If the operator sets the deck height dial to the install position, the operator may push and hold the deck height lever forward (or actuate the lower button or switch) to signal the electronic controller to command the linear actuator to lower the mower deck to the ground for installation or removal.

In one embodiment, height of cut control system 100 may include deck height display 154 that provides continuous visual feedback to the operator of the actual height of the mower deck. The deck height display also may show the actual height 156 compared to the desired cutting height 158. For example, potentiometer 160 on linear actuator 110 may provide electronic signals indicating actual deck height to electronic controller 150, and deck height dial 148 may provide electronic signals of the desired cutting height to the electronic controller. The electronic controller may show both on the display while mowing. The deck height dial, deck height control and deck height display may be located in or next to the operator station 162 of the tractor or other vehicle, so the operator may see the actual height and/or desired cutting height, and adjust the actual height and/or desired cutting height while mowing.

In one embodiment, height of cut control system 100 may automatically adjust the actual height of the mower deck while mowing. Electronic controller 150 may receive electronic signals from potentiometer 160 and deck height dial 148 indicating if the actual height is the same as the desired cutting height, or how much the actual height may be off the desired cutting height. If the electronic controller determines the actual height of the mower deck is at least a specified amount such as ¼ inch off the desired cutting height, the controller may automatically adjust the mower deck by commanding linear actuator 110 to raise or lower the mower deck until the potentiometer shows the actual height of the mower deck is at the desired cutting height.

Figure 4:
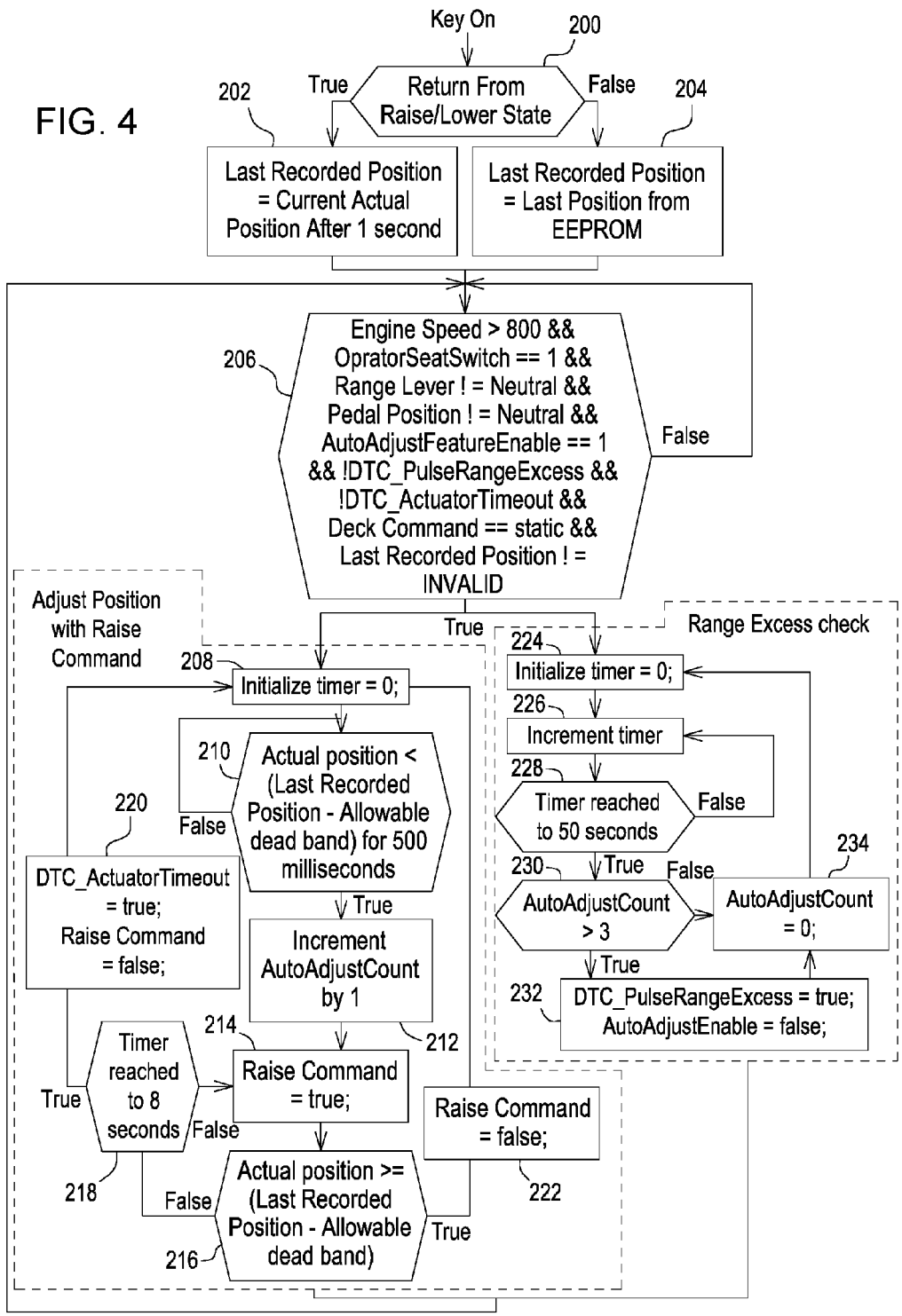
FIG. 4 is a logic diagram for a controller to monitor the actual height of the mower deck, compare actual deck height to the operator's last height setting, and automatically raise the deck back to the operator's last height setting according to a second embodiment of the invention.

FIG. 4 shows a second embodiment with logic that may be in the form of a series of software steps executed by electronic controller 150 to continuously monitor the actual height of the mower deck during operation, compare the actual deck height to the operator's last height setting, and command linear actuator 110 to automatically raise the deck to the operator's last height setting. Optionally, deck height display 154 will not show these adjustments to avoid operator distraction.

In the second embodiment shown in FIG. 4, the electronic controller may record the operator's last height setting in steps 200-204. For example, in step 200 the electronic controller may determine if linear actuator 110 has returned from the raise/lower state. In other words, the electronic controller may determine if the linear actuator has finished raising or lowering the mower deck to the operator's last height setting. If the linear actuator has returned from the raise/lower state, in step 202 the electronic controller may record the operator's last height setting as the current actual deck height. The controller may record this setting after a time delay such as one second. If the linear actuator has not returned from the raise/lower state, in step 204 the electronic controller may record the operator's last height setting based on the last height setting stored in EEPROM memory.

In the second embodiment shown in FIG. 4, in step 206 the electronic controller may check several variables indicating if required safety interlocks are in place. For example, the safety interlocks checked by the controller in step 206 may include the engine running at or above a specified speed such as 800 rpm, the operator seat switch indicating a seated operator, the pedal position switch in neutral, the range lever switch in neutral, and others. If the controller determines that all required safety interlocks are in place, the controller may adjust the deck height using the raise command in steps 208-222. If the controller determines that one or more safety interlocks are not in place, the controller logic may remain at step 206 without adjusting deck height until the safety interlocks are in place.

In the second embodiment shown in FIG. 4, the electronic controller may execute steps 208-222 to provide commands to the linear actuator to raise the mower deck to the last recorded height setting. The controller also may provide a limit for the length of time for each adjustment of mower deck height, to assure that the adjustment time is not excessive, which may be due to a malfunction such as a mechanical or electrical failure. For example, in step 208 the controller may initialize a timer at 0. In step 210, the electronic controller may determine if actual deck height, based on a potentiometer signal, is lower than the last recorded height setting less an allowable dead band. For example, the allowable dead band may be about 10 mm or less. The controller may make this comparison for a pre-specified time period such as 500 msec. If the controller determines actual deck height is not lower than the last recorded height setting minus an allowable dead band, the controller may return to step 210 and continue monitoring actual deck height. If the controller determines actual deck height is lower than the last recorded height setting less the allowable dead band, the controller may increment the auto adjust count by one in step 212. The controller may increment the auto adjust count by one each time it makes a deck height adjustment. In step 214, the controller may turn on the linear actuator by changing the raise command to on or true, and increment the timer. When the raise command is on or true, the controller may provide signals to the linear actuator to raise the mower deck. In step 216 the controller may determine if the actual deck height is higher than or equal to the last recorded height setting, minus an allowable dead band. If the actual deck height is higher than or equal to the last recorded deck height setting, minus the allowable dead band, the controller may turn off the linear actuator by changing the raise command to off or false in step 222, and return to step 208. If the actual deck height is not higher than or equal to the last recorded height setting, minus the allowable dead band, the controller may determine if the timer has reached a specified maximum time such as 8 seconds in step 218. If the timer has reached the specified maximum time, in step 220 the controller may change the timeout variable to on or true, the timeout variable being one of the interlocks in step 206 for disabling the auto adjust feature. If the timer has not reached the specified maximum time, the controller may return to step 214 and continue commanding the linear actuator to raise the mower deck and increment the timer.

In the second embodiment shown in FIG. 4, while the controller executes steps 208-220 to adjust deck height, the controller also may execute steps 224-234 to limit the number of adjustments during a pre-specified time period. For example, in step 224, the controller may initialize a timer at 0. In step 226, the controller may increment the timer. In step 228, the controller may determine if the timer has reached a pre-specified time such as 50 seconds. If the timer has not reached the pre-specified time, the controller may return to step 226 and continue incrementing the timer. If the timer has reached the pre-specified time, the controller then may determine if the count of deck height adjustments, from the auto adjust count incremented in step 212, is greater than a pre-specified maximum count such as 3. If the controller determines the auto adjust count is not greater than the maximum count during the specified time, the controller may reset the auto adjust count to zero in step 234. If the controller determines the auto adjust count is greater than the maximum during the specified time, in step 232 the controller may set the excess adjustment variable to on or true, the excess adjustment variable being one of the interlocks in step 206 used to disable the auto adjust feature, and reset the auto adjust count to zero in step 234. The auto adjust count may be reset each time the controller and mower is powered on, so that the controller may limit the count of adjustments of mower deck height during a pre-specified time.

Having described a preferred embodiment, it will become apparent that various modifications can be made without departing from the scope of the invention as defined in the accompanying claims.

The invention claimed is:

1. A height of cut control system, comprising:
   a mower deck having a lift linkage;
   an electric linear actuator connected to the lift linkage and to an electronic controller;
   a height of cut dial connected to the electronic controller and having a plurality of operator-selected desired cutting heights;
   a deck height control connected to the electronic controller that commands the electric linear actuator to adjust the mower deck to the desired cutting height when the deck height control is in a down position or an up position, or when the mower deck shifts away from the desired cutting height while mowing;
   a potentiometer connected to the electronic controller and providing signals indicating the actual height of the mower deck;
   a deck height display connected to the electronic controller and showing the actual height and the desired cutting height;
   wherein the electronic controller counts a number of adjustments to the desired cutting height and discontinues making adjustments upon reaching a pre-specified maximum count.

2. The height of cut control system of claim 1 further comprising a deck lift assist spring connected to the lift linkage and urging the lift linkage to raise the mower deck.

3. The height of cut control system of claim 1 wherein the height of cut dial includes an install position below the desired cutting heights and a locked position above the desired cutting heights.

4. The height of cut control system of claim 1 wherein the deck height display is in an operator station and provides continuous visual feedback.

5. A height of cut control system, comprising:
   a mower deck having a lift linkage;
   an electronic controller commanding an electric linear actuator connected to the lift linkage;
   the electronic controller determining how far the mower deck shifts from an operator selected cutting height during operation; and if the mower deck shifts at least a specified amount off the operator selected cutting height while mowing, the electronic controller automatically adjusts the mower deck by commanding the electric linear actuator to move the mower deck back to the operator selected cutting height until a count of automatic adjustments exceeds a pre-specified maximum during a specified time period.

6. The height of cut control system of claim 5 further comprising a visual display showing the actual height of the mower deck compared to the operator selected cutting height.

7. The height of cut control system of claim 5 further comprising a deck height dial that may be used to set the operator selected cutting height.

8. The height of cut control system of claim 7 further comprising a deck height lever causing the electric linear actuator to move the mower deck to the operator selected cutting height of the deck height dial.

9. A height of cut control system, comprising:
an actuator bell crank attached to a mower rockshaft of a lift linkage supporting a mower deck;
an electric linear actuator connected to the actuator bell crank;
a deck height dial connected to an electronic controller that commands the electric linear actuator to raise or lower the mower deck to a desired cutting height on the deck height dial; and
a deck height display connected to the electronic controller and showing the actual deck height compared to the desired cutting height;
the electronic controller continuously monitoring the actual deck height during operation, and commanding the electric linear actuator to raise the mower deck if the mower deck shifts to an actual deck height that is lower than the desired cutting height until reaching a maximum number of times the mower deck is raised during a specified time period.

10. The height of cut control system of claim 9 further comprising a deck lift assist spring connected to the mower rockshaft and urging the mower rockshaft to rotate in a direction to raise the mower deck.

11. The height of cut control system of claim 9 further comprising a deck height control that may be actuated to cause the electronic controller to command the electric linear actuator to raise or lower the mower deck to the desired cutting height.

* * * * *